P. P. DEMPSEY.
HIGH SPEED OIL ENGINE.
APPLICATION FILED MAY 15, 1915.
1,198,013.
Patented Sept. 12, 1916.
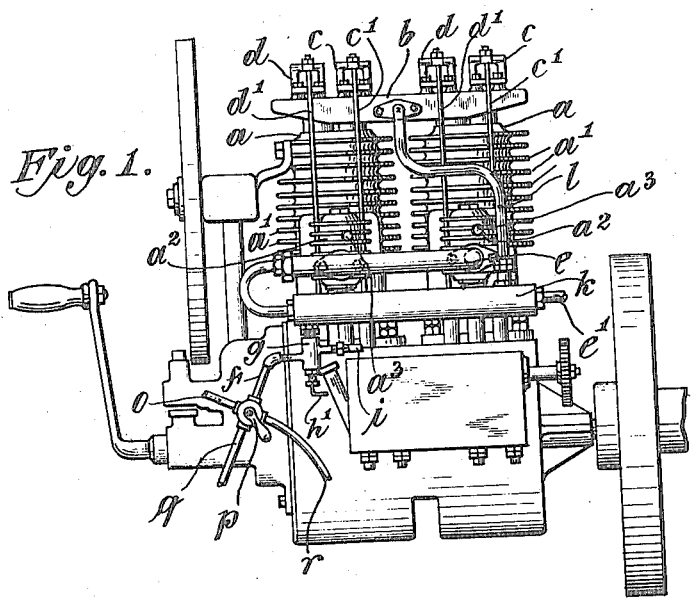
Fig. 1.
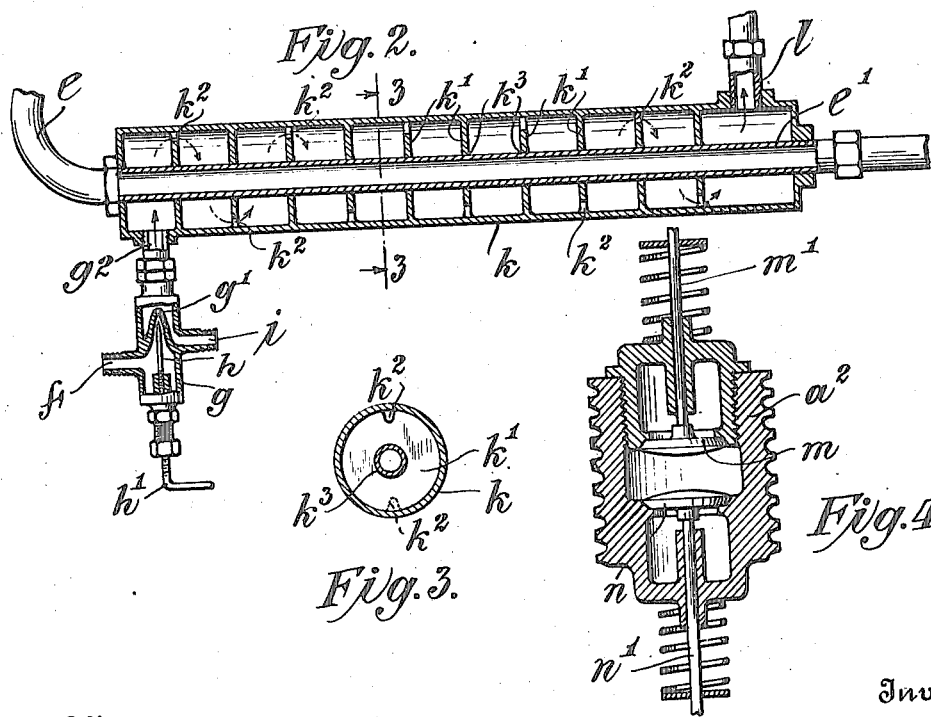
Fig. 2.
Fig. 3.
Fig. 4.

UNITED STATES PATENT OFFICE.

PETER P. DEMPSEY, OF NEW YORK, N. Y., ASSIGNOR, BY DIRECT AND MESNE ASSIGNMENTS, TO DEMPSEY OIL ENGINE COMPANY, INC., OF NEW YORK, N. Y., A CORPORATION OF NEW YORK.

HIGH-SPEED OIL-ENGINE.

1,198,013.

Specification of Letters Patent. Patented Sept. 12, 1916.

Application filed May 15, 1915. Serial No. 28,277.

*To all whom it may concern:*

Be it known that I, PETER P. DEMPSEY, a citizen of the United States, residing in the borough of Manhattan of the city of New York, in the State of New York, have invented certain new and useful Improvements in High-Speed Oil-Engines, of which the following is a specification, reference being had to the accompanying drawings, forming a part hereof.

This invention relates to means for forming from oil an explosive mixture for the operation of internal combustion engines of the common four-cycle type in which the fuel employed is a light volatile hydrocarbon, such as gasolene, and ignition thereof produced by an electric spark.

The relatively low efficiency of the modern gas engine and the great cost of operating it have long been recognized and efforts have been made to produce an oil engine which would satisfy all commercial requirements and be adaptable for use under the conditions surrounding light gas engines, such as are used on automobiles, etc. Thus far, however, all successful oil engines have been of the stationary type, of excessive bulk and weight, and have required special means for vaporizing or spraying the heavy oil into the cylinder and other special means for bringing about ignition of the mixture.

The object of the present invention is to provide a light four-cycle engine which will satisfy the commercial and engineering requirements surrounding the use of present day gas engines and which shall be operated by a mixture formed from oil, the desirability of which as a fuel needs no special mention.

The invention provides means whereby the oil is carbureted prior to its admission to the working cylinder and is formed into a dry gas which is readily combustible upon the addition of the proper proportion of air and, further, is of a character which permits its ready ignition by an electric spark created in the firing chamber in any approved manner. In accordance with the invention, the fuel oil is vaporized in any desired manner so as to bring it into a wholly gaseous state and is combined in this preliminary step with a relatively small portion of air, the mixture thus formed being too rich for combustion. This gaseous mixture is then preferably drawn through a heating chamber from where it passes into the cylinder of the engine, the latter being kept at a temperature above what may be termed the "critical" temperature, that is, the temperature at which the gaseous oil would condense or revert to its liquid condition. The rich mixture, after being taken into the cylinder, is supplemented by an additional quantity of air which may pass directly into the cylinder through an auxiliary intake, this additional quantity of air being so proportioned to the preformed gaseous mixture as to create immediately a combustible mixture, the ignition of which may then be brought about by an electric spark, as pointed out above. The various cycles of operation of an engine operated in accordance with the present invention, remain substantially unchanged from standard practice now employed in light gas engines, the intake, compression, explosion and exhaust strokes following one another in regular order. The means for practising the same will be pointed out with greater detail hereinafter, reference now being had to the accompanying drawings in which is illustrated, by way of example, an engine equipped with the improved devices for practising the invention.

In these drawings Figure 1 is a view in side elevation of a light, air cooled engine of the standard four-cycle type to which has been added the improved means. Fig. 2 is a fragmentary view in detail, and on a much larger scale, of the carbureting and heating chamber for the fuel oil. Fig. 3 is a view in transverse section, taken through the chamber shown in Fig. 2 on the line 3—3 and looking in the direction of the arrows. Fig. 4 is a detail view in section, on a somewhat larger scale, of the auxiliary air intake carried on the engine cylinder and communicating therewith and with the exhaust.

While the present invention is not to be limited in its application to any particular type of engine, it will appear as this description proceeds that it is necessary for the cylinder of the engine to be maintained at such a temperature that the gaseous mixture drawn into it will not have its temperature so reduced as to cause condensation. In furtherance of this condition there has been illustrated in the accompanying drawings an internal combustion engine in which the surrounding air is relied upon for cooling. This engine may comprise two or more cylinders $a$ on the external surface of which may be formed radiating flanges or webs $a'$ and into which the fuel may be drawn through an intake manifold $b$ and past overhead valves $c$, the action of which may be controlled through lifter rods $c'$ driven from a cam shaft (not illustrated) in a manner well known. Likewise, a portion of the burnt gases may be exhausted through other overhead valves $d$ which are also controlled in their action by other lifter rods $d'$, although an independent exhaust $e$, into which each cylinder discharges, is also provided, as will appear more fully hereinafter. The charge of fuel may be derived from any convenient source through a passage $f$ which may communicate with any approved form of carbureting device $g$, herein illustrated, for convenience, as comprising a relatively small spraying passage $g'$, the extent of the opening of which is controlled by a needle valve $h$, on the stem of which may be formed a handle $h'$ to facilitate manual adjustment. The carbureting device $g$ has also formed therein an air inlet duct $i$ which leads a limited volume of fresh air into intimate association with the fuel after the latter has passed through the spraying passage $g'$. It is to be understood that other forms of carbureting devices may be employed without departing from the spirit of the invention, the function of this device being only to create a very rich mixture in which the proportion of air is so slight with respect to the volume of fuel that the mixture will not preignite. From the carbureting device $g$ the rich mixture is led through a suitable heating chamber $k$ in which the hydrocarbon and the air are thoroughly commingled. This heating chamber may also be modified in structure without departing from the spirit of the invention, although the illustrated embodiment is simple in construction and effective in operation. The chamber $k$ is formed as a long cylinder, the interior of which is divided by a number of transverse plates $k'$ which may conveniently be cast integral with the chamber and in each one of which is formed an opening $k^2$ for the passage of the rich mixture therethrough. In the preferred form, the openings $k^2$ in successive plates are diametrically opposed so that the gas is caused to take a tortuous path in its passage through the chamber, this effect being secured by placing the carbureting device $g$ in communication with the cylinder at one end thereof, as through a passage $g^2$, and leading the gas from the opposite end of the chamber through a pipe $l$ which communicates with the intake manifold $b$. Extending longitudinally through the chamber $k$ and fitting snugly in central openings $k^3$ formed in the plates $k'$ and disposed substantially coaxially with respect to the chamber, is a section $e'$ of pipe to which is secured the exhaust pipe $e$ hereinbefore referred to. By this construction, the gases from the exhaust $e$ are led through the chamber $k$ and the pipe $e'$ radiates its heat and thereby heats the rich gaseous mixture passing through the chamber $k$.

Without attempting, at this point, to outline the operation of the engine, it may be stated briefly that when the rich mixture is drawn into the proper cylinder $a$ on the suction stroke of the engine, it becomes necessary to introduce into the cylinder a supplementary supply of fresh air which will combine with the mixture so as to form a suitable gas before the compression stroke. In the illustrated embodiment, this supplementary charge of air is introduced into the cylinder through a valve cage $a^2$, either secured to or formed integral with the cylinder walls in substantially the same plane as that in which the piston is in its lowermost position, as will appear. The valve cage $a^2$, as shown in Fig. 4, has mounted therein a spring-pressed check valve $m$ which is operated automatically by the suction of the piston and serves to control the inflow of fresh air through the port $a^3$, past the valve and into the cylinder, whenever the piston uncovers the communicating passage to the cage $a^2$ on its suction stroke. In the cage $a^2$ is also seated a valve $n$, the stem $n'$ of which is in operative engagement with the main cam shaft of the engine, whereby the valve $n$ is unseated periodically and in proper phase relation to the cycle of operations of the engine, for the purpose of permitting the exhaust of burnt gases from the cylinder into the exhaust pipe $e$, in the usual manner.

In operation, it is desirable to start the engine by some highly volatile hydrocarbon, such as gasolene. This initial starting charge may be passed through the carbureting device $g$ from a source of supply $o$, the communication of which with the carbureting device may be controlled by a four-way cock $p$ to which may also lead a supply pipe $q$ for crude oil or the like and a third supply pipe $r$ which may lead from a supply of kerosene or other fuel of about the same character. The cock $p$, it will now appear, is turned to permit the flow of gasolene from the supply $o$ to the carbureting device $g$, from whence it will be drawn through the chamber $k$ and introduced into the cylinder $a$ through the intake manifold $b$ under the control of the inlet valve $c$. After the motor is turned over a few times and the engine walls become heated to a degree, the cock $p$ may be turned so as to place the kerosene supply $r$ in communication with the carbureting device $g$ whereupon the kerosene will be formed into a rich mixture with the preliminary air supply derived through the duct $i$ and will be drawn into the cylinder and serve to drive the piston. Later, the cock $p$ may be turned so as to bring the heavy oil supply $q$ in communication with the carbureting device $g$, and since the invention is concerned primarily with reference to the use of a heavy oil for the driving of the motor, a more detailed description will be given with this heavy oil as the fuel. When the oil is drawn past the needle valve $h$ which has been adjusted so as to give the proper spraying or subdividing of the particles of oil, the vapor thus formed will be drawn into contact with the small volume of air which enters through the relatively small duct $i$. The mixture formed at this stage is too rich to be explosive and accordingly passes into the heating chamber $k$ and into intimate contact with the hot exhaust pipe $e'$ without danger of ignition. The suction in one or more of the cylinders $a$ is of course transmitted through the inlet pipe $l$ to the chamber $k$ so that the rich mixture is drawn through this chamber along the tortuous path indicated by the dotted arrows in Fig. 2 and created by the staggered positions of the openings $k^2$ in the successive plates $k'$. During the passage through the chamber $k$ the rich gas becomes heated under the influence of the heat radiated from the exhaust $e'$. From the chamber $k$ the rich mixture is drawn into one of the cylinders $a$ upon the opening of the intake valve $c$ and the suction stroke of the piston in the cylinder. When this piston uncovers the port leading from the cylinder to the valve cage $a^2$, sufficient suction is applied to the check valve $m$ to unseat the same and permit the inflow of a quantity of air through the port $a^3$ to the interior of the cylinder where the air will commingle with the rich mixture. The valve $m$ will, of course, return to its seat as soon as the suction drops to a predetermined point and the length of time for which the valve $m$ is unseated may be regulated by controlling the tension of its spring $m'$, the object being, of course, to introduce just sufficient air into the cylinder as will form a combustible gas of most desirable properties. Upon the compression stroke of the piston the combustible mixture thus created will be compressed in the firing space, as usual, and exploded by means of an electric spark in a manner now well known in gas engine practice. Following the working stroke of the piston, the exhaust valve $n$ in the cage $a^2$ will be unseated to permit the exhaust of the greater part of the burnt gases before the piston moves upward an appreciable distance, although the overhead exhaust valve $d$ will also be opened during the exhaust stroke and permit the escape therethrough of the remaining gases. The primary object in providing the exhaust valve $n$ is to afford a convenient means for leading hot gases to the heating chamber $k$, the exhaust gases being relied upon, in the illustrated embodiment, for the initial heating and drying of the rich gaseous mixture, as explained before. It is important to note that during the operation of the engine, no effort is made to cool the cylinder walls to such an extent as is known in gas engine practice but, on the contrary, the cooling action of the surrounding air alone is relied on.

It is important to maintain the walls of the cylinder at such a relatively high temperature and certainly at a point above the critical temperature, so that the heated gases drawn from the chamber $k$ shall not be cooled appreciably and so that the hydrocarbon element shall not be condensed.

From the description given it will be evident that the gist of the invention resides in the provision of means whereby a light, portable internal combustion engine of standard form may be driven by means of an explosive mixture created in a novel manner and formed from a heavy oil and air and adapted to be exploded by an electric spark created in the cylinder in any convenient way.

It will be evident that other means than those herein illustrated may be employed for forming the explosive mixture, but it is to be understood that all modifications in the means which do not depart from the gist of the invention as herein pointed out are to be deemed within the scope of the invention provided such modifications fall within the scope of the appended claims.

I claim as my invention:

1. In an internal combustion engine having a cylinder and piston, means for operating the same comprising a source of supply of a highly volatile hydrocarbon, such as gasolene, a source of supply of heavy oil, a carbureting device for said hydrocarbons, a valve to control the communication between each one of the sources of supply and the carbureting device, a restricted air inlet duct through which a limited quantity of air insufficient to form an explosive mixture is admitted to the carbureting chamber, a heating chamber through which the rich mixture is drawn from the carbureting device, a valve controlled connection from this chamber into the engine cylinder, and an auxiliary air supply through which a supplemental volume of air is drawn directly into the cylinder and there added to the rich mixture to form an explosive gas.

2. In combination with an internal combustion engine having a cylinder and piston, means for forming an explosive mixture from oil comprising a carbureting passage for the oil having an adjustable needle valve to control the same, a restricted air inlet port through which a limited quantity of air is combined with the vaporized gas, a heating chamber into which the rich mixture is drawn from the carbureting device, said chamber having formed therein a series of transverse plates, each one of which is provided with an opening diametrically opposed to the openings in adjacent plates, whereby the mixture is caused to travel along a tortuous path, an inlet pipe through which the mixture passes into the cylinder, a valve cage carried on the cylinder and communicating with the interior thereof, a check valve mounted in the cage and operable automatically under the suction of the piston to admit to the cylinder a sufficient volume of air to form with the rich mixture an explosive gas, a valve controlled exhaust passage formed in the valve cage, and an exhaust pipe through which the burnt gases are led from said exhaust passage to the heating chamber.

3. In an internal combustion engine having a cylinder and piston, means for operating the same comprising a source of supply of a highly volatile hydrocarbon, such as gasolene, a source of supply of a heavier oil, such as kerosene, a source of supply of crude oil, a carbureting device for all of said hydrocarbons, a valve to control the communication between each one of the sources of supply and the carbureting device, a restricted air inlet duct through which a limited quantity of air insufficient to form an explosive mixture is admitted to the carbureting chamber, a heating chamber through which the rich mixture is drawn from the carbureting device, a connection from this chamber into the engine cylinder, and an auxiliary air supply through which a supplemental volume of air is drawn directly into the cylinder and then added to the rich mixture to form an explosive gas.

This specification signed this 6th day of May, A. D. 1915.

PETER DEMPSEY.